F. P. MURPHEY.
CORN PLANTER VALVE MECHANISM.
APPLICATION FILED JAN. 15, 1909.
943,634.
Patented Dec. 14, 1909.
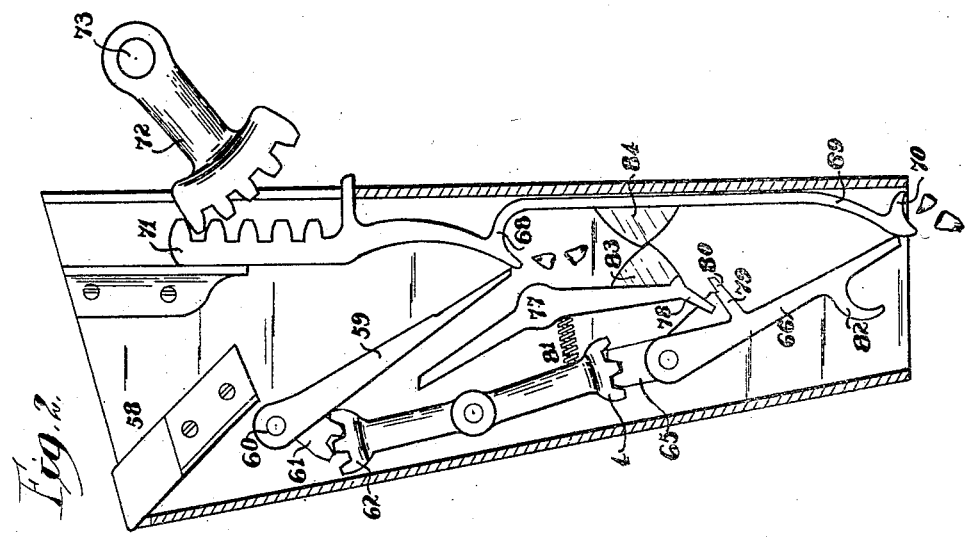
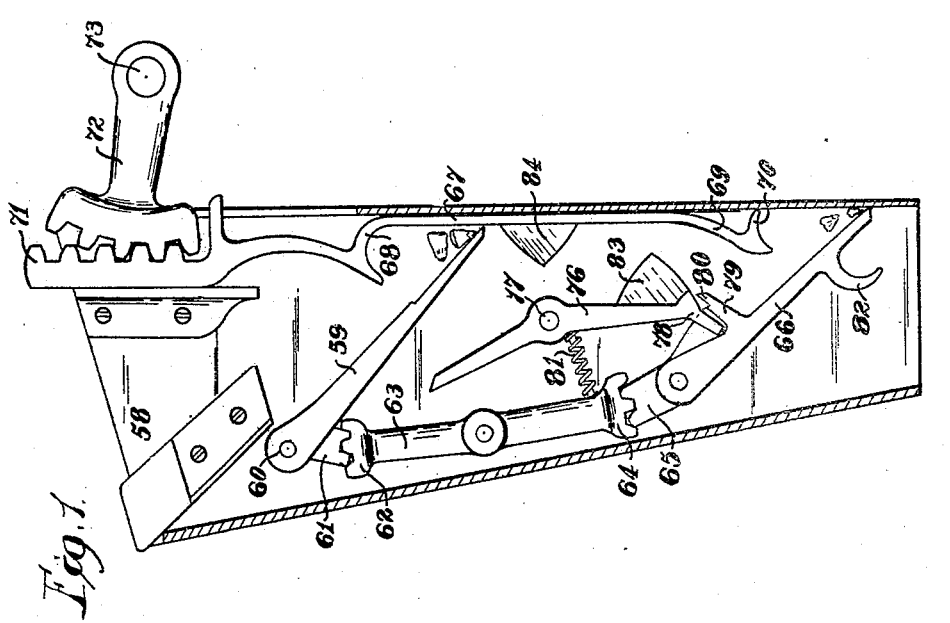
Witnesses:
Pierson W. Banning
Frances M. Frost
Inventor
Frank P. Murphey
By Banning & Banning
Attys.

UNITED STATES PATENT OFFICE.

FRANK P. MURPHEY, OF DECATUR, ILLINOIS.

CORN-PLANTER VALVE MECHANISM.

943,634.  Specification of Letters Patent.  Patented Dec. 14, 1909.

Original application filed November 3, 1908, Serial No. 460,954. Divided and this application filed January 15, 1909. Serial No. 472,473.

*To all whom it may concern:*

Be it known that I, FRANK P. MURPHEY, a citizen of the United States, residing at Decatur, in the county of Macon and State of Illinois, have invented certain new and useful Improvements in Corn-Planter Valve Mechanism, of which the following is a specification, the same being a division of application Serial No. 460,954, filed November 3, 1908.

The valve mechanism of the present invention has for its object to positively feed down the kernels of grain which are measured out and admitted to the valve by dropper mechanism of any suitable character. In devices of this kind it is desirable to discharge the required number of kernels from a point very near the ground every time the planter engages a knot in a check row wire not shown, in order that the grain may fall instantly and strike the ground at the intended point.

The present invention provides intermediate and discharging valve gates which operate in unison and serve to regulate the down feed and discharge of the grain.

A further object of the invention is to provide means for throwing the valve gates out of commission to adapt the valve for use in drilling, where an uninterrupted discharge of grain is desirable, and also to the means for automatically releasing the valve gates from their inoperative position when further intermittent feeding is desired.

Further objects will appear from a detailed description of the invention, which consists in the features of construction and combination of parts hereinafter described and claimed.

In the drawings, Figure 1 is a sectional elevation taken through the valve chute or casing, and showing the valve members in closed position; and Fig. 2 a similar view showing the valve members in discharging position.

The grains of corn or other seed are discharged into a chute 58 which extends down to proximity with the ground and forms the housing for the valve elements which control the descent of the corn after it has been measured out by suitable dropper mechanism. The dropping grains strike against an intermediate valve gate 59 which is pivoted at the end 60, which end, adjacent to the pivotal point, is provided with rack teeth 61 which mesh with rack teeth 62 on the upper end of a centrally pivoted rack bar 63 which, at its lower end, is provided with similar teeth 64. The latter teeth are in mesh with teeth 65 on the upper end of a pivoted discharge valve gate 66 which controls the final discharge of the kernels and is located near the lower end of the chute. The two valve gates are held in diagonal relation with respect to the ground level and in position to normally bring their free ends adjacent to the wall of the chute, as shown in Fig. 1. The valve gates coöperate with a vertically slidable discharging bar 67 which is provided, above the intermediate gate, with an offset forming a shoulder 68 which overhangs the free end of the intermediate gate, and the lower end of the discharging bar is inturned at the lower end 69, and terminates in a thumb 70 which overlies the free end of the discharge gate.

When the parts are in the position shown in Fig. 1, a clearance is afforded between the shoulder 68 and the base of the thumb 70 for the free passage of grain down to the extreme ends of the respective gates. The progress of the grain down the intermediate gate is arrested by contact of the grain with the inner face of the bar 67, and the progress of the grain down the discharge gate is similarly arrested by contact with the forward wall of the chute. The discharging bar is provided, at its upper end, with rack teeth 71 in mesh with the teeth of a swinging rack bar 72 which is mounted upon a rock shaft 73 having on its end a yoke, not shown, which is adapted to be tripped by the usual check row mechanism. As the discharging bar is moved from the position shown in Fig. 1 to the position shown in Fig. 2, the free ends of the pivoted gates will be simultaneously contacted by the shoulder 68 and the thumb 70, and thereafter the continued movement of the bar serves to throw down the valve gates out of their initial position, thereby throwing the ends of the gates away from their points of contact and allowing the grain to fall. The shoulder 68 and the thumb 70 more particularly serve to positively discharge the grain in case it should be held or wedged for any reason, and the action of the double-ended pivoted rack bar 63 causes the two valve gates to move in unison with one another.

In order to throw the gates out of position and to permit uninterrupted discharge of the grain, as is the case in drilling, a rock bar 76 is provided which is pivoted by means of a pin 77. The lower end 78 of the rock bar is rearwardly bent or turned and serves to engage a stop finger 79 on the discharge gate. The stop finger is shouldered at its end 80, and the locking bar is engaged by a spring 81 which extends between the locking bar and the rack bar and serves to forwardly project the lower end of the locking bar and rearwardly project the lower end of the rack in order to hold the parts in normal positions. The discharge gate is provided, near its free end, with a hook 82 which permits the gate to be drawn back to a position in which the lower end of the locking bar will engage the shouldered end of the stop finger which serves to lock both the intermediate and discharge gates in retracted position, thereby permitting an uninterrupted flow of grain through the chute. In order to release the parts from their locked position, the locking bar is provided with a cam lug 83 which coöperates with a cam lug 84 on the discharging bar, which lugs are adapted to be brought into engagement as the discharging bar is moved to its lowermost position. The engagement of the cam surfaces serves to knock the locking bar away from its position of contact with the shoulder on the stop finger, and permits the spring 81 to act on the double-ended rack bar, which serves to throw back the gates into normal position for controlling the descent of the grain.

The operation of the valve will be fully understood from the foregoing description, from which it will be seen that the kernels of grain will be positively fed down and discharged in the required quantity, and that the intermittent feeding of the grain will be controlled by the action of the valve gates which operate in unison with one another at all times. The locking mechanism provided for throwing the valve out of commission is extremely simple and at the same time permits the valve gates to be adjusted from a convenient and accessible point, and permits both of them to be controlled by the movements of the lowermost valve gate. The arrangement, furthermore, is one which automatically throws the valves again into commission as soon as the corn planter is again brought into engagement with a knotted check row wire, after which the intermittent feeding will continue without interruption. The construction is one which does not rely entirely upon gravity to carry down the grain, since the kernels are positively carried down from their intermediate and from their final or discharging positions. The construction is a simple one, and the parts can be readily cast or stamped and easily mounted within a chute or casing of moderate size.

What I claim as new and desire to secure by Letters Patent is:

1. In corn planter valve mechanism, a chute, an intermediate valve gate pivoted obliquely therein, a discharge valve gate pivoted obliquely therein below the intermediate valve gate, a discharging bar adjacent to the free ends of the valve gates, and provided with shoulders or abutments adapted to carry down the grain arrested by the gates, a member engaging both of the gates for regulating their movements, such member being in the form of a double-ended rack bar pivoted intermediate the gates and provided with teeth at each end, and rack teeth on each of the gates in mesh with the teeth of said bar, substantially as described.

2. In corn planter valve mechanism, a chute, an intermediate valve gate pivoted obliquely therein, a discharge valve gate pivoted obliquely therein below the intermediate valve gate, a discharging bar adjacent to the free ends of the valve gates, and provided with shoulders or abutments adapted to carry down the grain arrested by the gates, a member engaging both of the gates for regulating their movements in unison with one another, a double-ended rack bar pivoted intermediate the gates and provided with teeth at each end, rack teeth on each of the gates in mesh with the teeth of said bar, and a lock bar adapted to engage one of the gates for holding both of the gates in retracted position to afford an uninterrupted discharge for the grain, substantially as described.

3. In corn planter valve mechanism, a chute, an intermediate valve gate pivoted obliquely therein, a discharge valve gate pivoted obliquely therein below the intermediate valve gate, a discharging bar adjacent to the free ends of the valve gates, and provided with shoulders or abutments adapted to carry down the grain arrested by the gates, a double ended rack bar pivoted intermediate the gates and provided with teeth at each end, rack teeth on each of the gates in mesh with the teeth of said bar, a pivoted lock bar, a stop finger on said gate adapted to engage the free end of the lock bar for holding both of the gates in retracted position to provide an uninterrupted discharge for the grain, substantially as described.

4. In corn planter valve mechanism, a chute, an intermediate valve gate pivoted obliquely therein, a discharge valve gate pivoted obliquely therein below the intermediate valve gate, a discharging bar adjacent to the free ends of the valve gates, and provided with shoulders or abutments adapted to carry down the grain arrested by the gates, a member engaging both of the gates for regulating their movements, such member being in the form of a double-ended rack bar pivoted intermediate the gates and provided with teeth at each end, rack teeth on each of the gates in mesh with the teeth of said bar, a lock bar pivoted adjacent to one of the gates, a stop finger on said gate adapted to engage the end of the lock bar for holding both of the gates in retracted position to provide an uninterrupted discharge for the grain, and lugs on the lock and on the discharging bar adapted to co-act with one another to throw back the lock bar out of engagement with the gate, substantially as described.

FRANK P. MURPHEY.

Witnesses:
J. H. KROUT,
Mrs. G. W. TUCKER.